Aug. 19, 1958 E. G. WAGNER 2,848,166
COUNTER
Filed Nov. 3, 1955
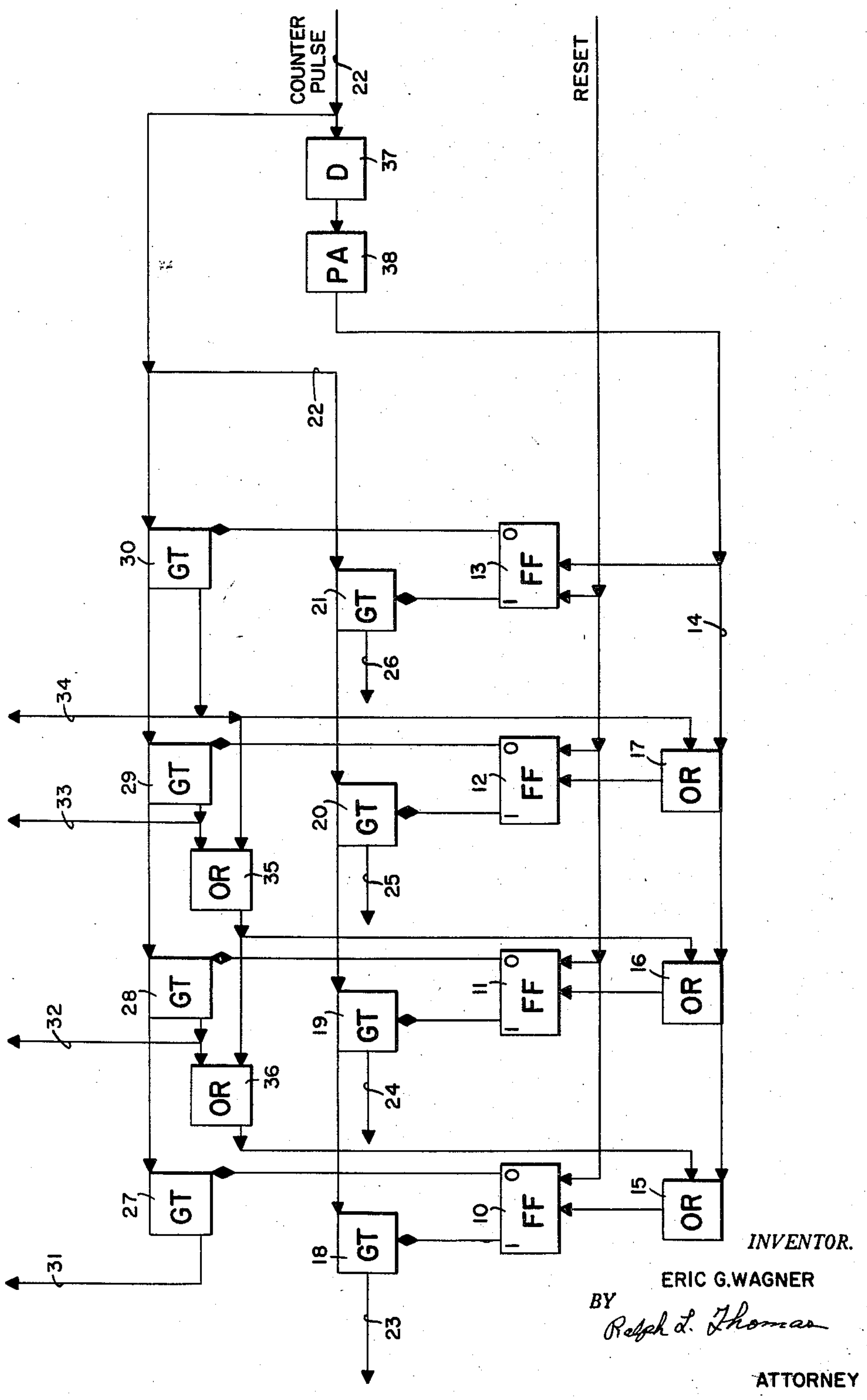
INVENTOR.
ERIC G. WAGNER
BY Ralph L. Thomas
ATTORNEY United States Patent Office 2,848,166
Patented Aug. 19, 1958

2,848,166
COUNTER

Eric G. Wagner, United States Army, assignor to International Business Machines Corporation, New York, N. Y., a corporation of New York Application November 3, 1955, Serial No. 544,742
8 Claims. (Cl. 235—92)

This invention relates to a counting device and more particularly to a counting device capable of bidirection counting operations.

An object of the present invention is to provide an improved counting device wherein a binary One is added to the previous count stored in the counter by reversing the stable state of those stages of the counter which so require that operation thereby eliminating the need for carry propagation time between stages.

Another object of this invention is to provide an improved counting device wherein means are provided to add One to the count previously stored in the counter by sensing which of the various stages of the counter should be caused to change the signals which they produce and applying an actuating signal to each of those stages simultaneously to cause such a change in their stable states.

A further object of this invention is to provide an improved counting device wherein signals representative of a binary number are changed to signals representative of the binary number plus One by sensing those signals which should be altered and directly changing only those signals which should be changed.

Another object of the present invention is to provide a simple circuit arrangement operative in response to successive input pulses both to count up and count down.

A further object of the present invention is to provide a bidirectional counting device which responds to an input pulse applied to a single input terminal to provide signals on one set of output conductors representing a number increased by one and to provide signals on another set of output conductors representing another number decreased by one.

A still further object is to provide a simple circuit arrangement for a bidirectional counter which is composed of relatively few components, thereby providing increased reliability and more economical construction.

Other objects of the invention are pointed out in the following description and claims and illustrated in the accompanying drawing which discloses, by way of example, the principle of the invention and the best mode which has been contemplated of applying that principle.

The invention may be more fully understood by referring to the drawing which shows a four stage counter constructed according to the principles of the present invention. Although the flip-flops, gates, Or circuits and power amplifiers employed in the counting device may be any suitable one of many well known varieties, they are preferably of the type shown and described in copending application Serial Number 414,459 filed March 5, 1954 by B. L. Sarahan et al. Also the delay unit employed may be any suitable one of many well known types, but preferably it is of the same general construction as that shown in copending application Serial Number 471,002, now abandoned, filed November 24, 1954 by Harold D. Ross et al. for Electronic Data Processing Machine.

As shown and described in the above mentioned copending application 414,459, a positive pulse applied to the input side of a flip-flop labeled with the numeral zero herein sets the flip-flop in a state of conduction arbitrarily selected to represent a binary zero; whereas a positive pulse applied to the input side of a flip-flop labeled with numeral one herein sets the flip-flop in a state of conduction arbitrarily selected to represent a binary one; and a positive pulse applied to the complement input terminal, positioned in the center of the lower side of each flip-flop, reverses the existing state of the flip-flop. A binary zero is represented whenever the zero output conductor in the upper right hand corner of each flip-flop supplies a positive D. C. level output, and a binary one is indicated when the one output conductor in the upper left hand corner of each flip-flop supplies a positive D. C. level output.

The pulse signals employed are preferably 20 to 40 volts positive and 0.10 microsecond in duration; while the D. C. signal levels are preferably on the order of 10 volts when positive and 30 volts when negative. Furthermore pulse signals and D. C. signals are represented on lines in the drawing by a conventional closed arrowhead and a diamond-shaped arrowhead respectively where circuit connections are made. The input and output lines for the block in the drawing are connected to the most convenient side of the block, including the same side in some cases. An input line to a corner of a block symbol and an output line from the adjacent corner of that block symbol indicates that the pulses or D. C. levels are applied to the input of the circuit represented by the block and the input conductor is directly connected to the output conductor of the adjacent corner. The wiring schematic for any block in question, given in the above mentioned copending applications, renders the actual circuit connections unmistakably clear.

A pulse applied to the line in the drawing labeled Reset clears flip-flops 10 through 12 to the zero state of condition and sets flip-flop 13 to the one state of conduction. A pulse on a conductor 14 is applied directly to the complement input of the flip-flop 13 and through Or circuits 15 through 17 to the complement input of the respective flip-flops 10 through 12. This pulse serves to complement the flip-flop register comprising the flip-flops 10 through 13 from the existing stable state to the opposite stable state.

In response to a pulse on line 22, gates 18 through 21 serve to pass a pulse to respective output conductors 23 through 26 provided that a positive D. C. level is simultaneously received from the corresponding one output side of the respective flip-flops 10 through 13. Similarly, the gates 27 through 30 respond to the same pulse to establish a pulse on respective output conductors 31 through 34 provided that a positive D. C. level is simultaneously received from the corresponding zero output side of the respective flip-flops 10 through 13. Assuming a positive output pulse from a gate is arbitrarily selected to represent a binary one and the absence of a pulse is arbitrarily selected to represent a binary zero, it is seen that pulse signals on the output conductors 23 through 26 from respective gates 18 through 21 represent in true form the binary number indicated by flip-flops 10 through 13; whereas the signals on the output conductors 31 through 34 from respective gates 27 through 30 represent the complement of the number indicated by flip-flops 10 through 13 where the complement is defined as changing one's to zero's and vice versa.

The outputs of the gates 28 through 30 are further associated with the complement inputs of the flip-flops 10 through 12 in such a manner as to effect a logical counting operation. Thus the output pulse, if there is one, from the gate 30 is supplied to the complement input of the flip-flop 12 through the Or circuit 17; to the complement input of the flip-flop 11 through an Or circuit 35 and the Or circuit 16; and to the complement input of the flip-flop 10 through the Or circuit 35, an Or circuit 36 and the Or circuit 15. Hence it can be seen that if the flip-flop 13 is in the zero state when a pulse is applied to the gate 30, the result is to complement the flip-flops 10 through 12 from the existing stable states to the opposite stable states. Whenever there is an output pulse from the gate 29, it is supplied through the Or circuits 35 and 16 to the complement input of the flip-flop 11 and through the Or circuits 35, 36 and 15 to the complement input of the flip-flop 10. Accordingly the pulse from the gate 29 serves to complement the flip-flops 10 and 11 from the existing stable states to the opposite stable states. If there is an output pulse from the gate 28, it is applied through the Or circuits 36 and 15 to the complement input of the flip-flop 10, thereby reversing the state of this flip-flop. In case any one of the Or circuits 15 and 16 should receive simultaneously a pulse from more than one of the gates 28 through 30, the effect is the same as if a single pulse had been received since all pulses received by the Or circuits 15 through 17 are substantially coincident in time. Suitable power amplifiers may be added where desired should the power requirements for the number of Or circuits exceed the power capacity of the gates used. After being delayed in a delay unit 37 until the flip-flops 10 through 12 have completed the foregoing complementing operation in response to output pulses from the gates 28 through 30, a component of the pulse on the conductor 22 is amplified in a power amplifier 38 and applied to the conductor 14, thereby complementing all flip-flops 10 through 13.

To summarize at this point, it can be seen that a pulse on line 22 serves (1) to sample the gates 18 through 21 and provide output signals representative of a true number held in the flip-flops 10 through 13, (2) to sample the gates 27 through 30 and provide output signals representative of the complement of the number held in the flip-flops 10 through 13 and (3) to cause certain of the flip-flops 10 through 13 to be complemented provided a pulse was passed by at least one of the gates 28 through 30, the complementing operation being controlled by the lowest order flip-flop which is in the zero state of conduction when a pulse is applied to the gates 27 through 30. After an input pulse on the conductor 22 causes the above noted operations, another component of this pulse, delayed in a delay unit 37 and amplified in a power amplifier 38, is applied to the conductor 14 to complement the register composed of flip-flops 10 through 13. The counter illustrated in the drawings can therefore be said to count by sensing which stage of the counter contains the least significant zero of the number and then causing that stage and all other lower stages of the counter to be complemented. In the illustrated embodiment this is accomplished by first complementing only those stages higher in order than the stage containing the least significant zero and then complementing all stages. Those stages higher in order than the stage containing the least significant zero are therefore complemented twice whereas the stage containing the least significant zero and all lower order stages are complemented only once.

In order to illustrate the simultaneous bidirection counting operation, assume the Reset line is first pulsed. This sets the flip-flops 10 through 12 in the zero state and the flip-flop 13 in the one state. The flip-flops 10 through 13 then represent the binary number 0001. The first counter pulse on the conductor 22 causes (1) the gates 18 through 21 to pass signals representative of the binary number 0001, (2) the gates 27 through 30 to pass signals representative of the binary number 1110, and (3) the flip-flops 10 and 11 to be complemented, thereby establishing temporarily the number 1101 in flip-flops 10 through 13; after the flip-flops 10 and 11 have completed the complementing operation, the delayed pulse from the delay unit 37 arrives on conductor 14 to complement all flip-flops 10 through 13 thereby representing therein the binary number 0010. A second counter pulse on the conductor 22 causes (1) the gates 18 through 21 to pass signals representative of the binary number 0010, simultaneously as (2) the gates 27 through 30 pass signals representative of the binary number 1101, (3) then the flip-flops 10 through 12 are complemented by a pulse from the gate 30 and the flip-flops 10 through 13 represent temporarily the binary number 1100; subsequently, the delayed pulse from the delay unit 37 complements all flip-flops 10 through 13 to represent the binary number 0011. By continuing in a similar manner for subsequent pulses, it can be seen that the number represented by signals from the gates 18 through 21 is progressively increasing while the number simultaneously represented by signals from the gates 27 through 30 is progressively decreasing. The results obtained by applying a reset pulse with each series of fifteen counter pulses, the capacity of the novel bidirection counter circuit illustrated, are tabulated for convenience of inspection in Table I below:

Table I

| Counter Pulse | Signals from Gates 18–21 | Signals from Gates 27–30 | Subtract One | Complement FF's 10–13 |
|---|---|---|---|---|
| Reset | | | | 0001 |
| 1 | 0001 | 1110 | 1101 | 0010 |
| 2 | 0010 | 1101 | 1100 | 0011 |
| 3 | 0011 | 1100 | 1011 | 0100 |
| 4 | 0100 | 1011 | 1010 | 0101 |
| 5 | 0101 | 1010 | 1001 | 0110 |
| 6 | 0110 | 1001 | 1000 | 0111 |
| 7 | 0111 | 1000 | 0111 | 1000 |
| 8 | 1000 | 0111 | 0110 | 1001 |
| 9 | 1001 | 0110 | 0101 | 1010 |
| 10 | 1010 | 0101 | 0100 | 1011 |
| 11 | 1011 | 0100 | 0011 | 1100 |
| 12 | 1100 | 0011 | 0010 | 1101 |
| 13 | 1101 | 0010 | 0001 | 1110 |
| 14 | 1110 | 0001 | 0000 | 1111 |
| 15 | 1111 | 0000(0) | 1111 | 0000 |
| Reset | | | | 0001 |
| 1 | 0001 | 1110 | 1101 | 0010 |
| 2 | 0010 | 1101 | 1100 | 0011 |

It can be seen from Table I that in response to the counter pulses an ascending count is provided by the gates 18 through 21 and a descending count is provided by the gates 27 through 30. From the drawing it can be seen further that both the ascending and descending counts are established simultaneously in response to the counter pulses on the line 22.

A statement of the mathematics involved in the counter circuit of the present invention may help to clarify the operations taking place. Since by definition the binary one's complement of a binary number is the changing of all one's in a number to zero's and the changing of all zero's to one's, it follows that the complement of a number is a high number if the number itself is a low number and vice versa. Because the number held in the flip-flop register composed of flip-flops 10 through 13 is read out in true form from the gates 18 through 21 as the complement of this number is read out from the gates 27 through 30, it follows that both a high number and a low number, or at least numbers of different magnitude, are provided in response to each counter pulse.

After the above read out operations occur, it is necessary to increase by one the number represented by the flip-flops 10 through 13 in order to provide the correct D. C. signals for read out purposes when the next counter pulse arrives. The operation of increasing the number represented in the flip-flops 10 through 13 by one is accomplished in two steps. First, the output pulses from the gates 28 through 30, which are coupled as explained previously to the complement inputs of the flip-flops 10 through 12, serve to change these flip-flops so that the number represented by the flip-flops 10 through 13 is the number shown in the column labeled "Subtract One." This number is the complement number previously supplied by the gates 27 through 30 reduced by one. This can be seen in Table I by comparing the column labeled "Signals from Gates 27—30" with the column labeled "Subtract One" wherein the latter is one less than the former. Second, the delayed pulse from the delay unit 38 causes the flip-flops 10 through 13 to be complemented, thereby establishing therein the number shown under the column labeled "Complement FF's 10—13" in Table I. This is the complement of the number shown in the column labeled "Subtract One." The number now represented by the flip-flops 10 through 13 is a true number which is equal to the number previously represented by signals from the gates 18 through 21 increased by one. This can be seen by comparing the column labeled "Complement FF's 10—13" with the column labeled "Signals from Gates 18—21" wherein the former represents a number which is one greater than the latter.

Thus there is shown and described a novel bidirectional counter device for providing simultaneously an ascending and a descending count which is simple in arrangement and economical to manufacture. Although only a four stage counter device is shown, it is to be understood that the number of stages may be increased or diminished in order to satisfy the demands of a particular system.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A counting apparatus including a first means for holding signals representative of a number, a second means coupled to said first means and responsive to a signal for reading out signals representative of the number held as signals in said first means and for reading out signals representative of the complement of the number held as signals in said first means and for changing the signals in said first means to represent the complement of that number decreased by one, third means coupled to said first means and responsive to a signal for causing the number represented as signals in said first means to be complemented, and fourth means coupled to said second and third means for supplying signals to be counted.

2. A counting apparatus including a first means for storing signals representative of a number, a second means coupled to said first means for reading out signals representative of the number stored in said first means, a third means coupled to said first means for reading out signals representative of the complement of the number stored in said first means, a fourth means coupled between said third means and said first means for changing the signals representative of a number in said first means to signals representative of the complement of that number reduced by one, and fifth means coupled to said first means for causing the number represented as signals in said first means to be complemented.

3. A counting device for providing simultaneously both an increasing and a decreasing count in response to signals, comprising first, second and third flip-flops each having at least a complement input and first and second outputs, a first set of three gates and a second set of three gates, each gate having a first input, a second input and an output, the first input of each gate in said first set of three gates being coupled to a corresponding first output of said first, second and third flip-flops, the first input of each gate in said second set of three gates being coupled to a corresponding second output of said first, second and third flip-flops, the output of said gate coupled to the second output of said first flip-flop being coupled to the complement input of said second and third flip-flops, the output of said gate coupled to the second output of said second flip-flop being coupled to the complement input of said third flip-flop, signal source means coupled to the second input of each gate in said first and second sets of gates, delay means coupled between said signal source means and the complement input of said first, second and third flip-flops whereby in response to said signal source means an increasing and a decreasing count are provided by said first and second sets of gates respectively.

4. A binary counting apparatus including a plurality of bistable devices, one for each stage of a multistage counter, means responsive to an input signal and responsive to signals produced by said bistable devices for producing at a first output signals representative of the true form of the number stored as signals in said bistable devices and for producing at a second output signals representative of the complement form of the number stored as signals in said bistable devices and means responsive to said second output signals for causing said bistable devices to change the signals that they produce.

5. A device for causing the signals representative of a multidigit number to be changed such that they represent the number changed by the value of One comprising a signal producing means for each digit of a multidigit number, each of said signal producing means being capable of producing signals representative of the value of the digit of the number to which it corresponds, means responsive to said signals produced by said signal producing means for detecting which one of said signal producing means corresponds to the least significant digit of said number which has a predetermined value and for causing that signal producing means and each signal producing means which corresponds to a lower significant digit to alter the signals which they produce.

6. A device for causing the signals representative of a multidigit number to be changed such that they represent the number changed by the value of One comprising a signal producing means for each digit of a multidigit number, each of said signal producing means being capable of producing signals representative of the value of the digit of the number to which it corresponds, means responsive to said signals produced by said signal producing means for detecting which one of said signal producing means corresponds to the least significant digit of said number which has a predetermined value, for causing all of the signal producing means which correspond to digits of higher significance to change the signals which they produce and for subsequently causing all of said signal producing means to change the signals which they produce.

7. A binary counter comprising a plurality of bistable devices, one for each stage of said binary counter, means responsive to an input signal for sensing the state of each of said bistable devices and for producing an output signal indicating which one of said plurality of stages is the lowest order stage of the counter that is in a predetermined state and means responsive to said output signal for causing that stage and all lower order stages to reverse their bistable state.

8. A device for causing the signals representative of a multidigit binary number to be changed such that they represent the number changed by the value of One comprising a bistable device for each bit of the binary number, each of said bistable devices being capable of producing signals representative of the value of the bit to which it corresponds, means responsive to said signals produced by said bistable devices for detecting which one of those devices corresponds to the least significant bit which has a predetermined value, for causing all of the bistable devices which correspond to bits of higher significance to be complemented and for subsequently causing all of the bistable devices to be complemented.

References Cited in the file of this patent

UNITED STATES PATENTS 2,703,202 Cartwright ------------ Mar. 1, 1955